US005929013A

United States Patent [19]

Kuriyama et al.

[11] Patent Number: 5,929,013

[45] Date of Patent: Jul. 27, 1999

[54] BLEACH PRODUCT

[75] Inventors: Yasuhisa Kuriyama; Jun Kokubu; Yasuo Hiro; Yoshiko Tsuji, all of Mie-ken; Tsuneo Kobayashi, Kanagawa-ken; Masahito Mikami, Kanagawa-ken; Shuzo Nakamura, Kanagawa-ken, all of Japan

[73] Assignee: Johnson Company Ltd., Kanagawa, Japan

[21] Appl. No.: 08/913,638

[22] PCT Filed: Mar. 11, 1996

[86] PCT No.: PCT/JP96/00602

§ 371 Date: Mar. 3, 1998

§ 102(e) Date: Mar. 3, 1998

[87] PCT Pub. No.: WO96/28533

PCT Pub. Date: Sep. 19, 1996

[30] Foreign Application Priority Data

Mar. 9, 1995 [JP] Japan .................................... 7-077115

[51] Int. Cl.[6] ............................ C11D 3/39; C11D 3/395; C09K 3/00; C01B 15/00

[52] U.S. Cl. ............... 510/313; 252/186.38; 252/186.29; 8/111

[58] Field of Search ......................... 252/186.29, 186.41, 252/186.38; 8/101, 111; 510/372, 375, 378, 501, 313; 564/39

[56] References Cited

U.S. PATENT DOCUMENTS

| | | | |
|---|---|---|---|
| 3,882,035 | 5/1975 | Loffelman et al. | 510/313 |
| 3,951,594 | 4/1976 | Smolens | 8/111 |
| 3,982,892 | 9/1976 | Gray | 8/111 |
| 3,986,972 | 10/1976 | Loffelman et al. | 510/376 |
| 4,025,453 | 5/1977 | Kravetz et al. | 8/111 |
| 4,086,175 | 4/1978 | Kravetz et al. | 510/314 |
| 4,199,466 | 4/1980 | Benson, Jr. | 510/314 |
| 4,337,060 | 6/1982 | Dalmas | 8/111 |
| 5,482,516 | 1/1996 | Sheppard | 8/111 |
| 5,591,378 | 1/1997 | Deline et al. | 252/186.38 |

FOREIGN PATENT DOCUMENTS

| | | | |
|---|---|---|---|
| 52-52880 | 4/1977 | Japan | 510/314 |
| 802035 | 9/1958 | United Kingdom | 510/314 |

*Primary Examiner*—Joseph D. Anthony

[57] ABSTRACT

A bleach product comprising an aqueous solution at a pH of 8 or more is disclosed that has an excellent bleaching activity without an irritating odor. The aqueous solution comprises: (A) from 0.5 to 60 weight percent of a compound selected from the group consisting of hydrogen peroxide and peroxide compounds which generate hydrogen peroxide in aqueous solution, (B) cyanourea and (C) an alkaline agent has. The product can be used for removal of mold with excellent results.

6 Claims, No Drawings

BLEACH PRODUCT

This application is a 371 of PCT/JP96/00602 filed Mar.11, 1996.

TECHNICAL FIELD

This invention is concerned with a peroxide bleach product with excellent bleaching activity. The bleach product of this invention is characterized by its content of cyanourea as the bleach activating agent and is used for bleaching of fabrics. The bleach product of this invention is preferably used for bleaching of mold developed on the walls of a house or furniture.

BACKGROUND ART

Bleaches and mold removers are classified into chlorine bleach and peroxide bleaches. Chlorine bleaches with the main component of sodium hypochlorite have been used for bleaching fabric and mold developed on the walls of a house or furniture because of its strong bleach activity. However, despite the excellent bleaching effectiveness, chlorine bleach products are fraught with weaknesses such as discoloration of the fabric, making its use inappropriate for colored fabric, unpleasant characteristic odor due to the chlorine molecule during use and the possible danger of poisoning due to chlorine gas.

On the other hand, peroxide bleaches have been used more frequently in the general household because of the wide applicability as a bleach compared to the chlorine type and the absence of malodor. However, the bleaching effectiveness of peroxide bleaches is inferior, if used alone, compared to chlorine bleaches, resulting in poor bleaching performance when used for fabrics at low temperatures and when used for bleaching mold on the surface of household walls or furniture, especially mold which develops on the sink in the kitchen and on the walls and ceiling of the bathroom and tile joints.

Consequently, attempts have been made to increase the bleaching activity by addition of N-acyl compounds such as tetraacetylethylenediamine (TAED) or tetraacetyl glycoluryl (TAGU) or esters such as glucose pentaacetate or saccharose octaacetate to peroxide compounds such as hydrogen peroxide, hydrogen peroxide adduct of sodium carbonate or sodium perborate. Various proposals have been made to use nitrile compounds as the activating agent for improved bleaching activity of peroxide compounds. United Kingdom Patent Application No. 802,035 described use of various nitrile compounds and U.S. patent application Ser. No. 3,882,035 described a bleach product containing iminodiacetonitrile as the activating agent. Japanese Kokai Patent Application No. Sho 52[1977]-52880 described nitriles such as p-chlorobenzoylcyanamide.

However, insufficient bleaching activity was obtained for fabrics at low temperatures and for removal of household mold by bleaching. There is another weakness in such bleach in that malodor, specifically peracetic acid was generated as the result of reaction of hydrogen peroxide in the use of activators such as N-acyl compounds, for example, TAED, and esters, for example, glucose pentaacetate.

DISCLOSURE OF INVENTION

This invention offers a bleach product with excellent bleaching activity on fabric as well as excellent activity for removal of mold on household walls and furniture by bleaching without malodor.

After intense studies for the solution of aforementioned problems, we discovered that a marked improvement can be made in bleaching of fabrics and removal of mold on household furniture and walls by bleaching without generation of malodor by the use of a bleach product composed of hydrogen peroxide or a peroxide which gives rise to hydrogen peroxide in aqueous solution, cyanourea and an alkaline agent, under the condition that alkalinity is achieved when the product is dissolved in water. The invention is the result of this discovery.

The invention offers a bleach product characterized by its content of (A) hydrogen peroxide or peroxide compounds which generate hydrogen peroxide in aqueous solution, (B) cyanourea and (C) an alkaline agent under the provision that pH 8 or higher is achieved in the aqueous solution of the product.

As (A) hydrogen peroxide or a peroxide which generates hydrogen peroxide in aqueous solution, one can use an aqueous solution of hydrogen peroxide or hydrogen peroxide with added sodium carbonate with a molar ratio between sodium carbonate and hydrogen peroxide of 2:3 or sodium perborate mono- or tetrahydrate.

As (B) cyanourea, one can use the solid or an alkaline aqueous solution of this compound.

As (C) an alkaline agent, one can use hydroxides of alkali metals or silicate salts of alkali metals. Among them, it is preferable to use silicate salts of alkali metal such as sodium and potassium silicate, because the bleaching activity is markedly improved by these compounds.

The bleach product of this invention can be used by sprinkling the components of the product, (A) hydrogen peroxide or a peroxide which generates hydrogen peroxide in aqueous solution, (B) cyanourea and (C) an alkaline agent, over the material to be bleached. Or the product can be used with the cleanser during washing. Also one can use an aqueous solution prepared beforehand by dissolving (A) hydrogen peroxide or a peroxide which generates hydrogen peroxide in aqueous solution, (B) cyanourea and (C) an alkaline agent in water.

In the use of the bleach product of this invention, it is preferable to use the aqueous solution of the product previously prepared to carry out the bleach process smoothly. In such a case, the content of hydrogen peroxide is 0.5–60 wt %, or preferably 0.5–30 wt %, or most preferably 0.5–10 wt % and practically 1–6 wt %. If the content is lower than this range, the bleaching activity is too low, and if its content is more than this range, handling becomes difficult. The content of (B) cyanourea is 0.2–30 wt %, or preferably 0.5–10 wt %, or most preferably 0.5–5 wt %. The content of (C) an alkaline agent is 0.1–20% so that the pH of the aqueous solution is 8 or higher, or preferably in the range of 9–13. It is necessary to use the alkaline agent to attain a high bleaching activity in the bleach product of this invention. The bleach product of this invention can be in the form of a homogeneous solution and of a slurry, in order to carry out the bleaching activity. When the bleach product of this invention is used for mold removal, such a previously prepared aqueous solution is convenient for easy application.

It is possible to improve the bleaching and cleaning effect by addition of a surfactant to the bleach product of this invention. As such a surfactant, one can cite polyoxyethylene alkyl ethers, polyoxyethylene fatty acid esters and amine oxides as nonionic surfactants, soap, alkyl sulfate salts and alkylbenzenesulfonate salts as anionic surfactants. It is preferable to add the surfactant at 0.1–5 wt % of the bleach product.

DESCRIPTION OF PREFERRED EMBODIMENTS

The invention is explained with application examples, but the invention is not limited by these examples.

Application Example 1

A bleach product was prepared by dissolving hydrogen peroxide at 3 wt %, cyanourea at 3 wt % and sodium metasilicate at 5 wt % in water at 10.9 pH.

With the bleach product thus obtained, the following tests were performed as described below: bleach test of fabric stained with black tea, bleach test of mold and evaluation of odor. The results are shown in Table I.

Test method and evaluation for bleach test of fabric stained with black tea

1) Preparation of fabric stained with black tea 10 g of black tea leaves wrapped in gauze were boiled for 5 min in 1000 mL water placed in a 1000 mL beaker followed by removal of tea leaves for preparation of black tea. A 50-g prewashed cotton broadcloth (#100) was soaked in the tea, which was continuously boiled for 30 min. The fabric was wrung by hand after cooling and was dried without exposure to sunlight.

2) Test method for bleaching fabric stained with black tea

Tea-stained fabric (5×5 cm) was placed in a crystallization dish (external circumference 12 cm, height 6 cm) and 20 g of the bleach product were added and left for 30 min. The fabric was taken out to be washed with tap water and dried without exposure to sunlight.

3) Method of evaluation

Reflectance the fabric was measured before staining with black tea, after staining with black tea and after bleaching using a colorimeter (differential colorimeter) and the bleaching rate was calculated using the following equation:

Bleaching rate (%) =(Rw−Rs)/(Ro−Rs) ×100

Ro: reflectance of fabric before staining with black tea

Rw: reflectance of fabric after bleaching

Rs: reflectance of fabric after staining with black tea.

Test method and evaluation of bleaching of mold

1) Mold culture method

Autoclaved agar culture medium was poured into sterile petri dishes to be seeded with black mold (*Aureobasidium pullulans*) and the dish was incubated in an incubator at 35° C. for 10 days.

2) Test method of bleaching of mold

A glass tube was placed over the agar plate on which mold had grown and the test solution was placed in the glass tube. 30 min later, the degree of bleaching of the black mold was measured.

3) Evaluation method

The degree of bleaching was classified in 3 stages, described below by macroscopic observation.

Degree of bleaching: completely bleached

Degree of bleaching: bleached to some degree

Degree of bleaching: almost or completely unbleached

Test method and evaluation of door

1) Odor test method 10 panel members were asked to sniff the bleach product for the sensory evaluation.

2) Evaluation of odor

Odor was classified as follows:

o: No irritating odor or malodor was sensed by almost all or all panel members.

Δ: About half of the panel members sensed an irritating odor or malodor.

x: Almost all or all panel members sensed an irritating odor or malodor.

Application Examples 2–7

Bleach products were prepared with altered components and contents as shown in Table I, where the term % indicates wt %. The pH of solution is shown in Table I.

Similar to above, the bleach test on black tea-stained fabric, the bleach test on mold and the evaluation of odor were performed with the results listed in Table I.

Application Examples 8–9

Bleach products were prepared using hydrogen peroxide with added sodium carbonate and sodium perborate hydrate instead of hydrogen peroxide. The hydrogen peroxide content with added sodium carbonate or sodium perborate monohydrate was expressed in terms of the hydrogen peroxide contained in these substances. Table II shows the results of the bleach test for fabric stained with black tea, the bleach test for mold and the evaluation of the odor, using these products.

Application Example 10

A bleach product was prepared similar to Application Example 1 except with added alkylamine oxide (trademark Aromox, Lion Akuzo [transliteration] K.K.) as the surfactant. The pH of the product is shown in Table II, in which the term % indicates wt %.

A bleach test of fabric stained with black tea, bleach test of mold and the evaluation of the odor were performed similar to above using the product and the results are shown in Table II.

Comparative Example 1

A bleach product was prepared using sodium hypochlorite as shown in Table III. The term % indicates wt %. Table III shows the pH of the product and the results of a bleach test of fabric stained with black tea, a bleach test of mold and an evaluation of the odor carried out with this product. The bleaching activity was excellent, but the malodor of chlorine was markedly sensed.

A bleach product was prepared similarly to Application Example 1, except for the use of cyanourea. Table III shows the pH of the product and the results of a bleach test for fabric stained with black tea, a bleach test for mold and the evaluation of the odor with this bleach product. The bleaching activity decreased.

Comparative Example 3

A bleach product was prepared with a content of sodium metasilicate at 2.5 wt % and using tetraacetylethylenediamine instead of cyanourea. Table III shows the pH of the product and the results of a bleach test for fabric stained with black tea, a bleach test for mold and the evaluation of the odor with this bleach product. The bleaching activity was slightly reduced with a strong malodor of peracetic acid.

Comparative Example 4

A bleach product was prepared similarly to Application Example 1, except for the addition of an alkaline agent. The pH of the product was 2.3, and the bleaching activity was reduced.

Comparative Example 5

A bleach product was prepared similarly to Application Example 1, except using iminodiacetonitrile instead of cyanourea. Table III shows the pH of the product and the results of a bleach test for fabric stained with black tea, a bleach test for mold and evaluation of odor. The bleaching activity was reduced.

Comparative Example 6

A bleach product was prepared with hydrogen peroxide with added sodium carbonate. Table III shows the pH of the product and the results of a bleach test for fabric stained with black tea, a bleach test for mold and the evaluation of the odor using this bleach product. The bleaching activity was reduced.

Application Example 11

A washing test was carried out on fabric stained with black tea using the mixture of a marketed detergent (trademark Hi-top, Lion K.K.) and hydrogen peroxide with added sodium carbonate, cyanourea and sodium metasilicate as the prescribed contents. Table IV shows the content of each component and the results.

Washing test and evaluation methods

1) Preparation of fabric stained with black tea

A similar method was used as in the bleach test for fabric stained with black tea.

2) Standard washing 0.75 g detergent and prescribed amounts of bleach and/or bleach product were dissolved in 900 mL tap water at 25° C. and 10 pieces of fabric stained with black tea (5×5 cm) and 30 pieces of cotton fabric for underwear (5×5 cm) were placed in the solution for washing in a targotometer [transliteration] (product of Daiei Kagaku Seiki Seisakusho) for 10 min followed by rinsing, water removal and drying.

3) Washing after soaking 0.75 g detergent and prescribed amounts of bleach product were dissolved in 150 mL tap water at 25° C. 10 pieces of fabric stained with black tea (5×5 cm) were soaked in the solution for 1 h at 25° C. Then 30 pieces of cotton fabric for underwear (5×5 cm) and 750 mL tap water at 25 C. were added for washing in a targotometer for 10 min followed by rinsing, removal of water and drying.

4) Method of evaluation

The bleach rate was calculated similarly to the bleach test for fabric stained with black tea and the mean was obtained for 10 pieces of fabric stained with black tea as the bleach rate.

Comparative Example 7

A washing test was carried out with detergent and hydrogen peroxide with added sodium carbonate as the bleach. The amounts added and the results are shown in Table IV. The bleach rate was reduced in the standard washing test and the washing test after soaking.

Comparative Example 8

A washing test was carried out with hydrogen peroxide with added sodium carbonate as the bleach and tetraacetylethylenediamine as the bleach activator. The amounts added and the results are shown in Table IV. The bleach rate was somewhat reduced in the washing test after soaking and bleaching the fabric stained with black tea resulted in a speckled condition.

Comparative Example 9

A washing test was carried out with hydrogen peroxide with added sodium carbonate as the bleach and iminodiacetylnitrile as the bleach activator. The amounts added and the results are shown in Table IV. The bleach rate was reduced in standard washing test and the washing test after soaking.

TABLE I

| Application Example | 1 | 2 | 3 | 4 | 5 | 6 | 7 |
|---|---|---|---|---|---|---|---|
| Hydrogen peroxide | 3% | 3% | 3% | 3% | 3% | 1% | 18% |
| Cyanourea | 3% | 3% | 3% | 5% | 1% | 3% | 3% |
| Sodium metasilicate | 5% | | | 5% | 5% | 5% | 5% |
| Sodium orthosilicate | | 5% | | | | | |
| Sodium hydroxide | | | 5% | | | | |
| Water | Rem* | Rem* | Rem* | Rem* | Rem* | Rem* | Rem* |
| pH | 10.9 | 11.3 | 13.0 | 11.1 | 11.4 | 11.5 | 9.6 |
| Bleach test for mold | III | III | III | III | III | II | III |
| Bleaching rate** | 94% | 95% | 92% | 96% | 90% | 86% | 96% |
| Evaluation of odor | ○ | ○ | ○ | ○ | ○ | ○ | ○ |

*remainder
**of fabric stained with black tea

TABLE II

| Application Example | 8 | 9 | 10 |
|---|---|---|---|
| Hydrogen peroxide | | | 3% |
| SPC*** | 3% | | |
| PB**** | | 2% | |
| Cyanourea | 3% | 3% | 3% |
| Sodium metasilicate | 5% | 5% | 5% |
| AAO***** | | | 1% |
| Water | Remainder | Remainder | Remainder |
| pH | 10.6 | 12.0 | 10.9 |
| Bleach test for mold | II | II | III |
| Bleaching rate** | 84% | 82% | 95% |
| Evaluation of odor | ○ | ○ | ○ |

**of fabric stained with black tea
***hydrogen peroxide with added sodium carbonate (concentration expressed as the concentration of hydrogen peroxide)
****sodium perborate monohydrate (concentration expressed as the concentration of hydrogen peroxide)
*****surfactant, alkylamine oxide

TABLE III

| Comparative Example | 1 | 2 | 3 | 4 | 5 | 6 |
|---|---|---|---|---|---|---|
| Hydrogen peroxide | | 3% | 3% | 3% | 3% | |
| SPC*** | | | | | | 3% |
| Sodium hypochlorite | 3.5% | | | | | |
| Cyanourea | | | | 3% | | |
| TAED****** | | | 3% | | | |
| Iminodiacetonitrile | | | | | 3% | |
| Sodium metasilicate | | 5% | 2.5% | | 5% | |
| Water | Rem* | Rem* | Rem* | Rem* | Rem* | Rem* |
| pH | 13.1 | 11.5 | 10.8 | 2.3 | 10.9 | 9.6 |
| Bleach test for mold | III | I | II | I | II | I |
| Bleaching rate** | 93% | 81% | 82% | 18% | 85% | 65% |
| Evaluation of odor | X | ○ | Δ | ○ | ○ | ○ |

*remainder
**of fabric stained with black tea
***hydrogen peroxide with added sodium carbonate (concentration expressed as the concentration of hydrogen peroxide)
******tetraacetylethylene diamine

TABLE IV

| | Ap. Ex. 11 | Co. Ex. 7 | Co. Ex. 8 | Co. Ex. 9 |
|---|---|---|---|---|
| Detergent | 0.75 g | 0.75 g | 0.75 g | 0.75 g |
| SPC*** | 0.075 g | 0.075 g | 0.075 g | 0.075 g |
| Cyanourea | 0.038 g | | | |
| TAED****** | | | 0.038 g | |
| IDAN******* | | | | 0.038 g |
| Sodium metasilic. | 0.075 g | | | |
| Bleach rate | | | | |
| Standard washing | 10% | 4% | 10% | 6% |
| Soaking/Washing | 34% | 16% | 29% | 24% |

***hydrogen peroxide with added sodium carbonate (concentration expressed as the concentration of hydrogen peroxide)
******tetraacetylethylene diamine
*******iminodiacetonitrile This invention offers bleach product with excellent bleaching activities and washing without irritating odor. The bleach product of this invention can be used effectively for removal of mold.

We claim:

1. A bleach product comprising an aqueous solution at a pH of 8 or more which contains: (A) from 0.5 to 60 weight percent of a compound selected from the group consisting of hydrogen peroxide and peroxide compounds which generate hydrogen peroxide in aqueous solution, (B) cyanourea and (C) an alkaline agent.

2. A bleach product as set forth in claim 1, further comprising from 0.1 to 5 percent by weight surfactant.

3. A bleach product as set forth in claim 1, wherein the content of cyanourea is from 0.2 to 30 weight percent, the content of alkaline agent is from 0.1 to 20 weight percent.

4. A bleach product as set forth in claim 3, wherein the content of hydrogen peroxide is from 0.5 to 30 weight percent, and the content of cyanourea is from 0.5 to 10 weight percent.

5. A bleach product as set forth in claim 3, wherein the alkaline agent is selected from the group consisting of hydroxides and silicate salts of alkali metals.

6. A bleach product as set forth in claim 5, wherein the alkaline agent is selected from the group consisting of sodium silicate and potassium silicate.

* * * * *